United States Patent
Garnweidner

(10) Patent No.: US 9,855,906 B2
(45) Date of Patent: Jan. 2, 2018

(54) RECEPTACLE FOR A TOWING MEANS AND METHOD OF MANUFACTURE

(71) Applicant: MAGNA INTERNATIONAL INC., Aurora (CA)

(72) Inventor: Peter Garnweidner, Lamprechtshausen (AT)

(73) Assignee: Magna International Inc., Aurora, ON (CA)

( * ) Notice: Subject to any disclaimer, the term of this patent is extended or adjusted under 35 U.S.C. 154(b) by 4 days.

(21) Appl. No.: 14/889,028

(22) PCT Filed: Jun. 20, 2014

(86) PCT No.: PCT/CA2014/000508
§ 371 (c)(1),
(2) Date: Nov. 4, 2015

(87) PCT Pub. No.: WO2014/201547
PCT Pub. Date: Dec. 24, 2014

(65) Prior Publication Data
US 2016/0107594 A1    Apr. 21, 2016

(30) Foreign Application Priority Data
Jun. 21, 2013    (DE) .......... 10 2013 211 794

(51) Int. Cl.
| | |
|---|---|
| *B60R 19/48* | (2006.01) |
| *B62D 25/20* | (2006.01) |
| *B60D 1/56* | (2006.01) |
| *B29C 65/06* | (2006.01) |
| *B29L 31/30* | (2006.01) |

(52) U.S. Cl.
CPC .............. *B60R 19/48* (2013.01); *B29C 65/06* (2013.01); *B60D 1/56* (2013.01); *B60D 1/565* (2013.01); *B62D 25/209* (2013.01); *B29L 2031/30* (2013.01)

(58) Field of Classification Search
CPC ........... B60R 19/48; B29C 65/06; B60D 1/56; B60D 1/565; B62D 25/209
See application file for complete search history.

(56) References Cited

U.S. PATENT DOCUMENTS

| | | | |
|---|---|---|---|
| 8,419,040 B2 * | 4/2013 | Ando ....................... | B60D 1/04 280/491.5 |
| 8,678,423 B1 | 3/2014 | Hwang | |
| 8,820,804 B2 * | 9/2014 | Shibata ................... | B60R 19/18 293/117 |
| 2008/0001383 A1 | 1/2008 | Hodoya et al. | |

(Continued)

FOREIGN PATENT DOCUMENTS

| | | | |
|---|---|---|---|
| DE | 102008057379 | * | 5/2010 |
| DE | 102008057379 A1 | | 5/2010 |

(Continued)

*Primary Examiner* — Kevin Hurley
*Assistant Examiner* — Marlon A Arce
(74) *Attorney, Agent, or Firm* — Dickinson Wright PLLC

(57) ABSTRACT

An arrangement is proposed of a receptacle consisting of multiple components for a towing means, especially a towing lug, on a support piece (1) attachable to the body of a motor vehicle, wherein the support piece is insertable into a receptacle on a cross member of the vehicle, and the support piece is to be joined with the cross member via friction-stir welds.

12 Claims, 2 Drawing Sheets

(56) References Cited

U.S. PATENT DOCUMENTS

| | | | | |
|---|---|---|---|---|
| 2008/0036179 A1* | 2/2008 | Andersen | ............... | B60D 1/06 280/511 |
| 2010/0089977 A1* | 4/2010 | Chen | ................... | B23K 20/122 228/114.5 |

FOREIGN PATENT DOCUMENTS

| | | | |
|---|---|---|---|
| JP | 2006-036158 | * | 2/2006 |
| JP | 2006036158 A | | 2/2006 |
| WO | 0204253 A1 | | 1/2002 |

* cited by examiner

RECEPTACLE FOR A TOWING MEANS AND METHOD OF MANUFACTURE

CROSS-REFERENCE TO RELATED APPLICATIONS

This U.S. National Stage Patent Application claims the benefit of PCT International Patent Application Serial No. PCT/CA2014/000508 filed Jun. 20, 2014 entitled "Receptacle For A Towing Means And Method Of Manufacture," which claims the benefit of DE Patent Application Serial No. 10 2013 211 794.9 filed Jun. 21, 2013, the entire disclosures of the applications being considered part of the disclosure of this application and hereby incorporated by reference.

FIELD OF THE INVENTION

The invention relates to an arrangement of a receptacle for a towing means, especially a towing lug, on a support piece attachable to the body of a motor vehicle, as well as a method for manufacture of the arrangement.

BACKGROUND

Such arrangements of a receptacle for a towing means are generally known from prior art. To direct the forces arising during towing of the vehicle to a longitudinal member of the vehicle body, such receptacles must be arranged in the area where a front cross member connects with the longitudinal member. Otherwise, during the towing, excessively great bending stresses of the cross member would arise. As a rule, so-called crash boxes are implemented for the connection between the front cross member and the particular designated longitudinal members of the front-end structures of vehicle bodies. These serve for bracing the cross member to the particular longitudinal member. In the event of an accident, the crash box functions as a deformation element which partially absorbs the energies that arise, and protects the longitudinal member from damage at low speeds. However, as is known from prior art, the deformation behavior of the bending element is altered in disadvantageous fashion by application of a multi-component receptacle for a towing means directly to such a crash box (receptacle covered by bending member). The result is a so-called block formation, so that the bending carrier no longer is able to absorb the energies arising to the desired degree and transmit them on to the crash box.

From DE 102008057379 an arrangement is known for a receptacle for towing means, which discloses a supporting piece screw-connected with a cross member.

Screwed connections have a drawback in that they always display settling behavior, and that the screws to be used, as additional components, complicate assembly, and also contribute to additional weight.

SUMMARY OF EMBODIMENTS OF THE INVENTION

Thus it is the task of the present invention to further develop an arrangement of a multi-component receptacle for a towing means according to the preamble of Patent Claim 1, so that improved crash behavior is achieved.

This problem is solved by an arrangement of a multi-component receptacle for a towing means according to the preamble of Patent Claim 1.

The problem is solved specifically by a receptacle for a towing means, having multiple components, on a supporting piece attachable on the body of a motor vehicle, wherein the supporting piece is to be inserted into a receptacle on the cross member of a vehicle, and the support piece is to be attached to the cross member by friction stir welding. This special type of welding makes it possible to provide a very rigid connection of the carrying piece with the cross member of the vehicle, without negative screw attachments present. Omitting the screwed attachments makes the assembly simpler and more reliable.

In advantageous fashion the support piece has a borehole for a towing lug.

By configuring the support piece with catches and hook-like projections, the support piece exhibits a shape which makes it simple to slide the support piece into the cross member and position it at the right place.

In advantageous fashion the support piece serves as a spacer for the attachment device of additional crash boxes situated behind the cross member. Additionally, it is advantageous that the support piece is caulked into a T-shaped groove of the cross member. The groove facilitates assembly and positioning of the support piece.

For manufacture of the arrangement, it is advantageous for the support piece to be welded in the cross member before or after the bending process of the overall cross member.

Welding is done preferably via at least 2 friction-stir welding points.

In the further course of the procedure it is advantageous if the support piece, after being connected with the cross member, is further processed, and in particular, a borehole is made for a towing lug. Possibly it could be advantageous to insert boreholes for the attachment of the crashbox perpendicular to the borehole for the towing lug.

In accordance with an aspect of at least one embodiment, there is provided a system for securing a towing lug to a vehicle that is to be towed, the system comprising: a cross member connected to a longitudinal member of the vehicle, the cross member having an interior cavity; and a support piece inserted into the interior cavity of the cross member, characterized in that: the support piece is fixedly attached to the cross member by friction-stir welding.

In accordance with an aspect of the at least one embodiment, the support piece exhibits a receptacle in the form of a borehole for a towing lug.

In accordance with an aspect of the at least one embodiment, the support piece on its end exhibits catches and hook-shaped projections.

In accordance with an aspect of the at least one embodiment the support piece serves as a spacer piece for an attachment device of a crash box.

BRIEF DESCRIPTION OF THE DRAWINGS

The invention is described in what follows in exemplary fashion, with reference to the appended drawing.

DETAILED DESCRIPTION OF THE DRAWINGS

Figure 1:
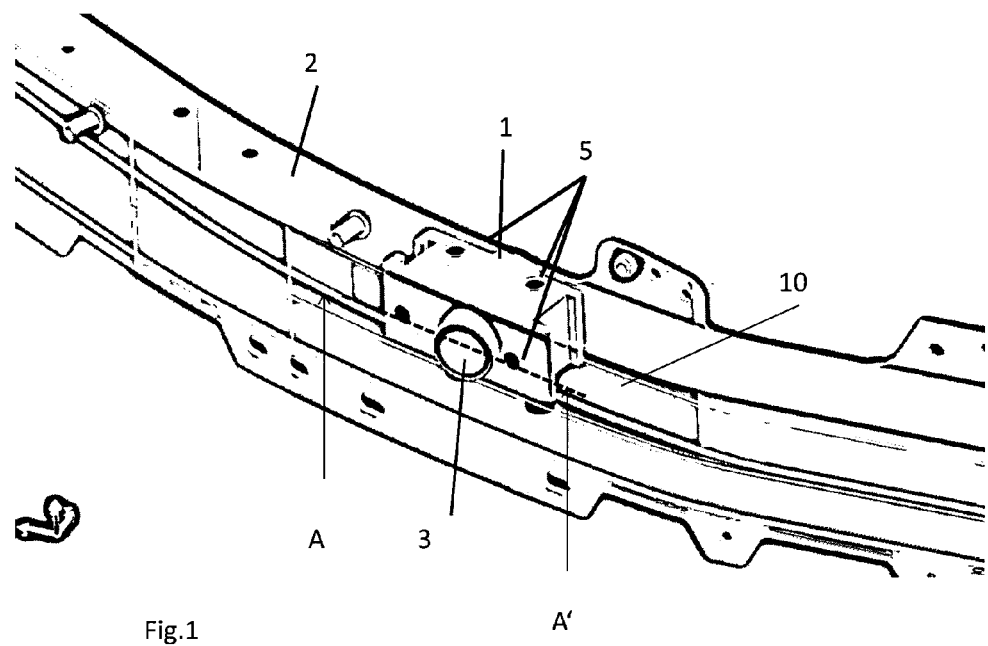
FIG. 1 is a schematic depiction of the exemplary embodiment form at the installation location.

FIG. 1 shows a cutout from a cross member 2, which is already bent in bowed fashion in this depiction.

As is shown in FIG. 1 the cross member exhibits at least one interior cavity 10. A support piece 1 is inserted into this cavity 10. The support piece is designed as an extruded profile. In this process, at no expense, details may be integrated such as a T-groove or projecting flanks for reducing rigidity discontinuities. In the chosen embodiment example, a catch 6 and hooklike arrangements 7 are perceptible on the support piece, especially in FIG. 2.

Also shown in FIG. 1 is a towing sleeve 3 in the already completely assembled support piece 1. The reference symbols 5 designate friction-stir weld points, which are to be placed to the left and right of the towing sleeve 3 to produce a connection with the cross member 2.

Friction-stir welding is a known process for the joining of materials. The rotating pin and sleeve tools are placed at the point of connection. The heat thereby produced converts the material into a plastifiable, non-fusible state. The rotating sleeve penetrates into the "doughy" material. Simultaneously the "inner" pin is withdrawn from the tool; a cavity is produced. This resulting cavity admits the displaced volume. The stamp lies flat on the material surface; material is prevented from escaping in uncontrolled fashion. The sleeve penetrates through the upper sheet and reaches the lower layer.

During the retrograde movement, the sleeve is withdrawn from the joint zone.

At the same time the pin compresses the plastic material back into the joining area; the cavity is again filled. By a brief resetting of the tools, the material becomes fixed. A material-locking, point-shaped and flat-configured connection is achieved.

Figures 2, 3:
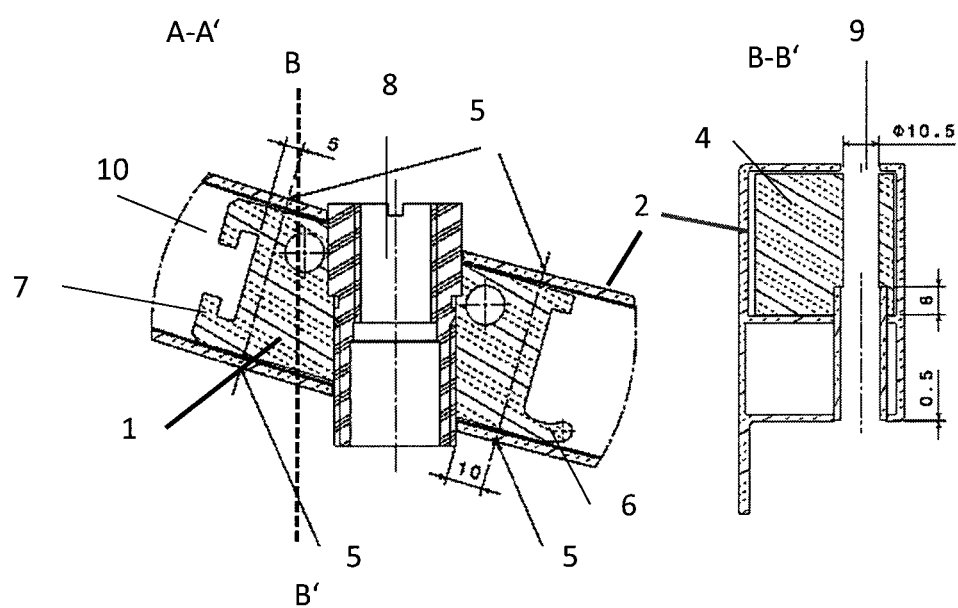
FIG. 2 shows a cross section along the axis A-A'.
FIG. 3 shows a cross section along the axis B-B'.

FIG. 2 shows a cross section along the section line A-A'. The support piece 1 sits flush in a receptacle in a cavity 10 of cross member 2. Via the friction-stir weld points 5, the two components are connected to each other. A borehole 8 generates a through-running opening through both of the components, to admit a towing sleeve 3.

FIG. 3 shows a cross section through the line B-B'. As shown in FIG. 3 a borehole 9 is provided for admitting a crash box. The crash box is not depicted in this drawing and would be located beneath the cross member 2. That the support piece is not screw-connected with the cross member, but rather via weld locations to be positioned as desired, poses no problem for placement of the boreholes 9 for a crash box potentially to be attached. The material of support piece 1 offers a spacer 4 for the through-running borehole.

The optimized manufacturing process for the cross member with the arrangement for a towing lug derives from extruded profiles. The cross member, and also the support piece itself, is manufactured from such an extruded profile.

The support pieces are produced from aluminum or magnesium extruded profiles. Alternatively, the support piece can also be made using a casting process.

In the manufacturing process, the two components are fitted together, and the support piece is caulked into the cross member. The next manufacturing step then is either joining of the components by welding and connection of the component combination into the desired form. The two final manufacturing steps can also be done in reverse: the component combination is then first bent, and only then is the support piece welded to the cross member.

Only after the welding and after the bending, are boreholes and apertures mechanically milled, and the requisite threadings cut. The additional steps in assembly of a cross member then proceed as already described in the prior art.

LIST OF REFERENCE SYMBOLS

1 Support piece
2 Cross member
3 Towing sleeve
4 Spacer piece
5 Friction stir point
6 Catch
7 Hooklike arrangement
8 Borehole for towing lug
9 Borehole for crash box
10 Internal cavity

The invention claimed is:

1. An arrangement of a towing receptacle for a vehicle body comprising:
   a cross member defining an interior cavity and having an inner front surface and an inner rear surface;
   a support piece disposed in the interior cavity and attached to the cross member by friction-stir welding;
   the support piece including a front support surface disposed flush with the inner front surface of the cross member and a rear support surface disposed flush with the inner rear surface of the cross member;
   a first borehole extending through both of the cross member and the support piece from the respective front to rear surfaces; and
   a towing sleeve disposed in the first borehole.

2. An arrangement according to claim 1, wherein the support piece extends along an axis A-A' between a first support end and a second support end, and each support end defining at least one of catches or hook-shaped projections.

3. An arrangement according to claim 2, wherein the support piece defines at least one second borehole extending through the support piece transverse to the axis A-A' for the attachment of a crash box to the cross member.

4. An arrangement according to claim 3, wherein the at least one second borehole is disposed between the towing sleeve and a respective support end of the support piece.

5. An arrangement according to claim 1, wherein the support piece has an extruded profile.

6. An arrangement according to claim 5, wherein the support piece is comprised of aluminum.

7. An arrangement according to claim 5, wherein the support piece is comprised of magnesium.

8. A method for manufacture of a towing arrangement for a vehicle body, the method comprising:
   inserting a support piece into an interior cavity of a cross member of the vehicle body;
   caulking the support piece into the cross member;
   attaching the inserted support piece to the cross member by friction-stir welding;
   drilling a first borehole through the cross member and the support piece; and
   inserting a towing sleeve into the first borehole.

9. A method according to claim 8, further comprising:
   bending the cross member into a bent end form before or after the support piece is welded to the cross member.

10. A method according to claim 8, wherein said attaching step includes attaching the inserted support piece to the cross member with at least two friction-stir weld points.

11. A method according to claim 8, further comprising:
    equipping the support piece with at least one second borehole extending perpendicular to the first borehole for the attachment of a crash box to the cross member.

12. A method according to claim 8, wherein the support piece extends along an axis A-A' between a first support end and a second support end each defining at least one of catches or hook-shaped projections, and wherein the step of inserting the support piece includes sliding the support piece into the cross member using the catches or hook-shaped projections.

* * * * *